United States Patent [19]

Okuda

[11] Patent Number: 5,085,191
[45] Date of Patent: Feb. 4, 1992

[54] TACHOMETER SIGNAL GENERATING DEVICE

[75] Inventor: Hiroshi Okuda, Himeji, Japan

[73] Assignee: Mitsubishi Denki Kabushiki Kaisha, Tokyo, Japan

[21] Appl. No.: 637,906

[22] Filed: Jan. 7, 1991

[30] Foreign Application Priority Data

Jan. 17, 1990 [JP] Japan .................... 2-6329

[51] Int. Cl.$^5$ .................... F02D 41/34; F02P 5/15; G01P 3/481
[52] U.S. Cl. .................... 123/414; 123/617; 123/643; 364/431.07; 364/565; 324/169
[58] Field of Search ............... 123/414, 476, 612, 617, 123/643; 73/115, 116, 518; 324/160, 163, 164, 169, 170, 176, 178; 364/431.07, 565

[56] References Cited

U.S. PATENT DOCUMENTS

| 4,059,799 | 11/1977 | Faria | 324/169 |
| 4,250,450 | 2/1981 | Yamada et al. | 324/169 |
| 4,494,518 | 1/1985 | Katayama et al. | 123/414 X |
| 4,499,875 | 2/1985 | Katayama et al. | 123/414 X |
| 4,687,991 | 8/1987 | Kruncos | 324/169 |
| 4,799,380 | 1/1989 | Suzuki et al. | 324/169 X |
| 4,811,255 | 3/1989 | Kelly, III | 364/565 |
| 4,950,983 | 8/1990 | Kruncos | 324/169 |
| 4,972,332 | 11/1990 | Luebbering et al. | 324/169 X |

FOREIGN PATENT DOCUMENTS 0066267 4/1987 Japan .

Primary Examiner—Willis R. Wolfe
Attorney, Agent, or Firm—Sughrue, Mion, Zinn, Macpeak and Seas

[57] ABSTRACT

A tachometer signal generating device comprises signal coils which generate pulse signals corresponding to predetermined crank angle positions in synchronism with revolution of an engine, and a microcomputer which generates ignition control signals or fuel control signals on the basis of the pulse signals and which generates a tachometer signal of 6 pulses/one revolution.

2 Claims, 4 Drawing Sheets

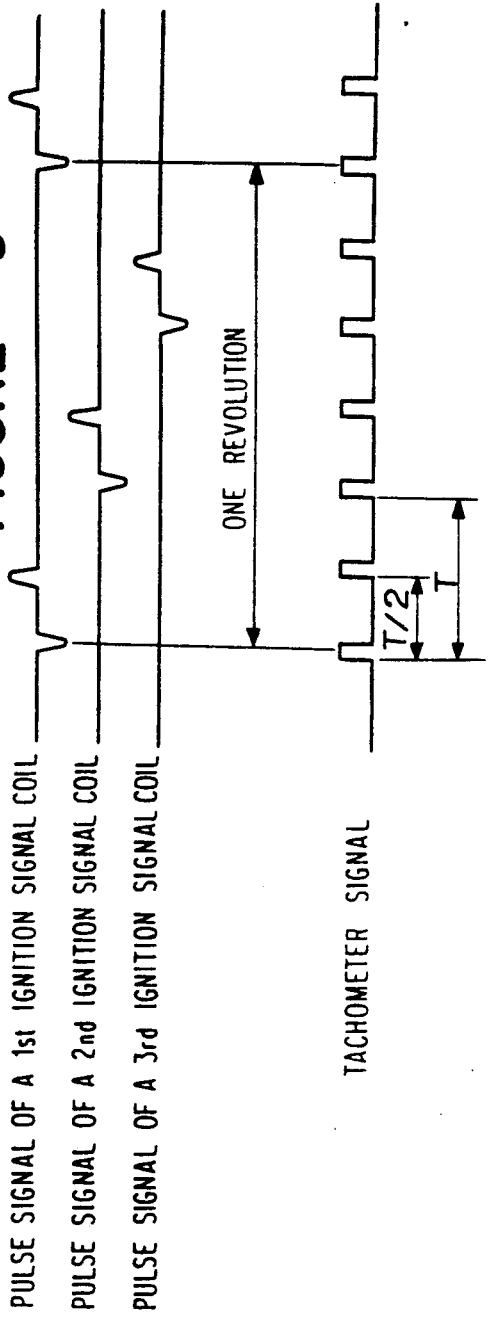
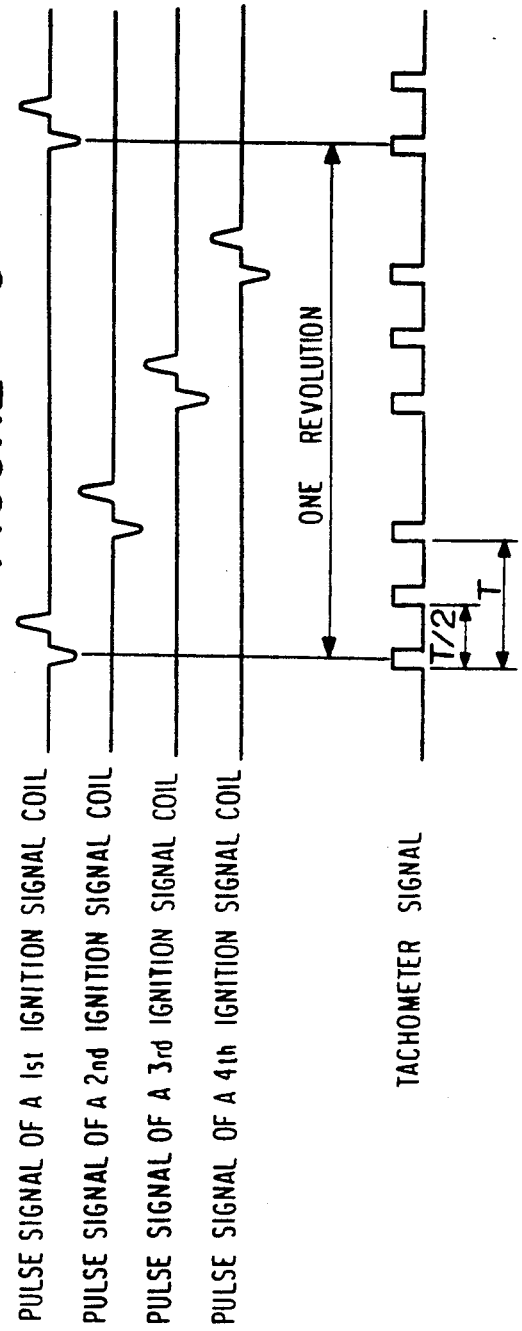

TACHOMETER SIGNAL GENERATING DEVICE

BACKGROUND OF THE INVENTION

1. Field of the Invention

The present invention relates to a tachometer signal generating device for an engine used for, for instance, an outboard engine.

2. Discussion of Background

A conventional tachometer signal generating device is described with reference to FIG. 7 which shows a circuit diagram of such device.

In FIG. 7, the conventional tachometer signal generating device comprises a lighting coil 1 for a generator, a lamp 2 and a tachometer wherein the lamp 2 and the tachometer are respectively connected in parallel to the lighting coil 1.

In the operation of the conventional device to be mounted on an outboard engine, the tachometer 3 receives signals indicating the number revolution from the lighting coil 1 of the generator.

When a 4-pole generator is used, a signal of 2 cycles/one revolution is outputted from the lighting coil 1. When a 6-pole generator is used, a signal of 3 cycles/one revolution is outputted. Further, in a case of 12-pole generator, a signal of 6 cycles/one revolution is outputted. Accordingly, it was necessary to use a tachometer 3 which corresponds to the number of poles of the generator.

In the market for the outboard engine, tachometers generating a signal of 6 pulses/one revolution are generally commercialized. Accordingly, in a case of an outboard engine having a six-pole generator, a 3-pulse signal into a 6-pulse signal by using a device such as a signal multiplier circuit. And then, a tachometer for an input of a signal of 6 pulses/one revolution is used. Accordingly, there was a problem of increasing cost.

Conventionally, a tachometer applicable to a different number of poles was proposed. However, it requires a switching circuit for the different number of poles, and the construction is complicated. Thus, there was a problem of cost increase.

SUMMARY OF THE INVENTION

It is an object of the present invention to provide a tachometer signal generating device capable of generating a tachometer signal of 6 pulses/one revolution without using a special signal multiplier circuit.

The foregoing and other objects of the present invention have been attained by providing a tachometer signal generating device which comprises signal coils which generate pulse signals corresponding to predetermined crank angle positions in synchronism with revolution of an engine, and a microcomputer which generates ignition control signals or fuel control signals on the basis of the pulse signals and which generates a tachometer signal of 6 pulses/one revolution.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is a signal waveform diagram showing the operation of the first embodiment of the present invention;

FIG. 6 is a signal waveform diagram showing the operation of the second embodiment of the present invention.

DETAILED DESCRIPTION OF THE PREFERRED EMBODIMENTS

Figure 1:
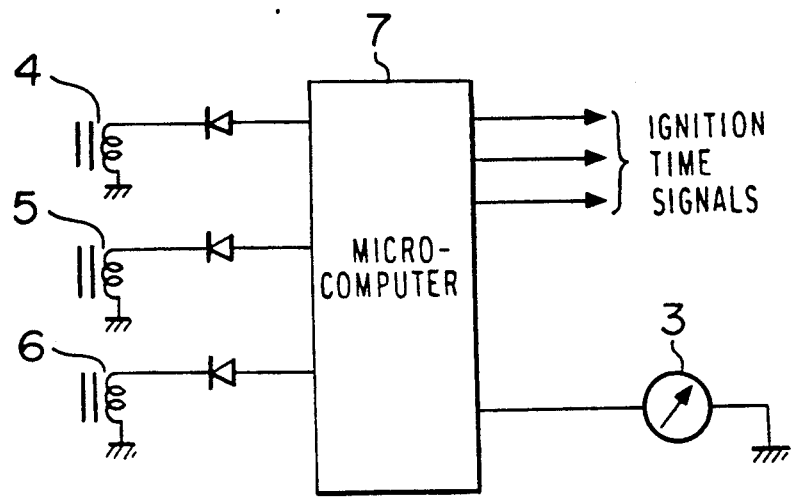
FIG. 1 is a circuit diagram showing a first embodiment of the tachometer signal generating device according to the present invention.

Referring to the drawings, wherein the same reference numerals designate the same or corresponding parts throughout several views, and more particularly to FIG. 1, there is shown a circuit diagram of a first embodiment of the tachometer signal generating device according to the present invention.

In FIG. 1 showing the tachometer signal generating device according to the first embodiment of the present invention, which is applied to a 3-cylinder engine, the tachometer signal generating device comprises a first ignition signal coil 4, a second ignition signal coil 5, a third ignition signal coil 6 and a microcomputer 7 which is connected to the ignition signal coils 4, 5, 6 and which operates ignition timing for each cylinder on the basis of the time points of the generation of signals at the ignition signal coils 4–6 and generates ignition timing signals.

Figure 2:
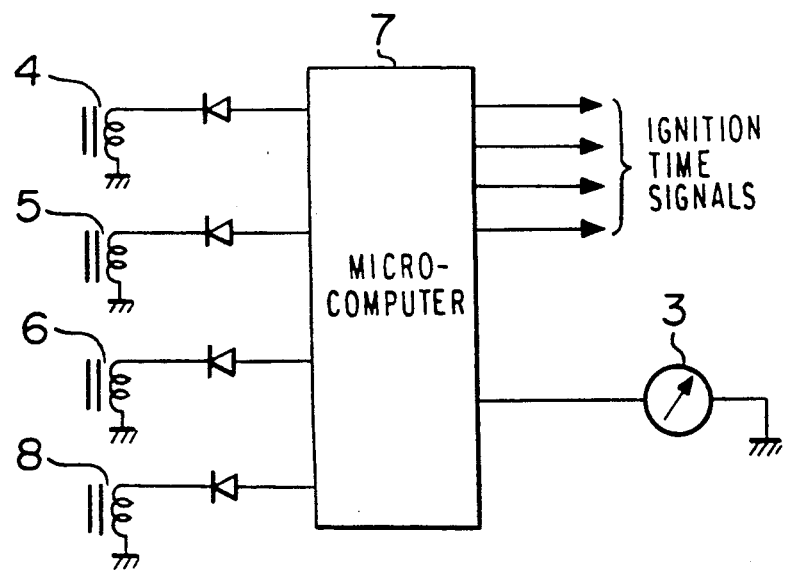
FIG. 2 is a circuit diagram showing a second embodiment of the tachometer signal generating device according to the present invention.

FIG. 2 shows the tachometer signal generating device of the second embodiment of the present invention which is applied to a 4 cylinder engine. The tachometer signal generating device comprises a first ignition signal coil 4, a second ignition signal coil 5, a third ignition signal coil 6, a fourth ignition signal coil 8 and a microcomputer 7 which is connected to the ignition signal coils 4–8 and which operates ignition timing for each cylinder on the basis of the time points of the generation of signals from the ignition signal coils 4–8 and generates ignition timing signal.

The operation of the first embodiment of the tachometer signal generating apparatus which is applied to a three-cylinder engine will be described with reference to FIGS. 3 and 5.

Figure 3:
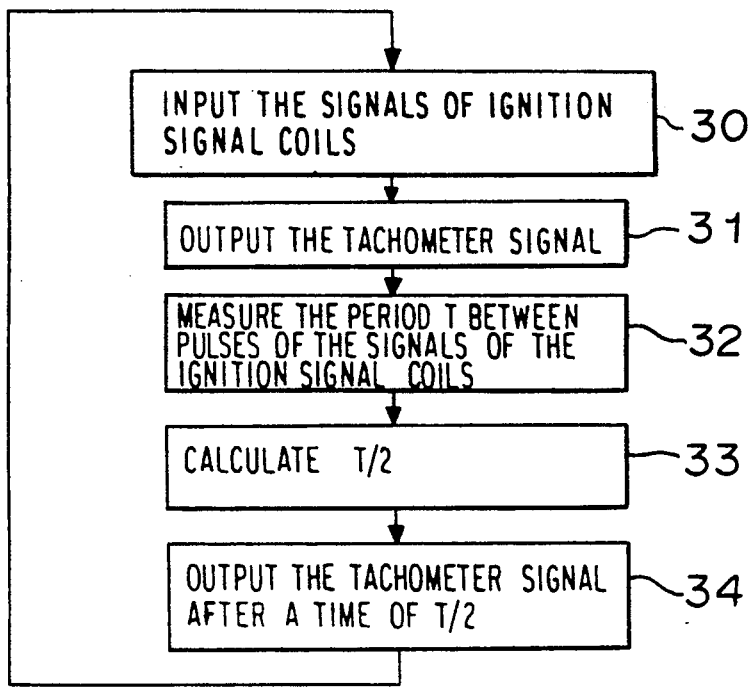
FIG. 3 is a flow chart showing the operation of the first embodiment of the present invention.

In FIG. 3, negative pulses of the signals of the ignition signal coils 4–6 are inputted into the microcomputer 7 at Step 30.

The microcomputer generates a tachometer signal in synchronism with the pulse signals to the tachometer 3 at Step 31.

At Step 32, the period T between the pulse signal at this time and the pulse signal at the last time is measured.

At Step 33, the half of the period T, i.e. T/2 is calculated.

At Step 34, a tachometer signal is outputted after a time of T/2.

Then, the sequential operation is returned to Step 30.

Thus, the microcomputer 7 generates the tachometer signal of 6 pulses/one revolution as shown in FIG. 5.

In the tachometer signal as in FIG. 5, a pulse at the first occurrence after the time period of T/2 from the starting of the operation can not be outputted because the period T is not yet measured.

The operation of the tachometer signal generating device of the second embodiment of the present invention, which is applied to a four cylinder engine, will be described.

Figure 4:
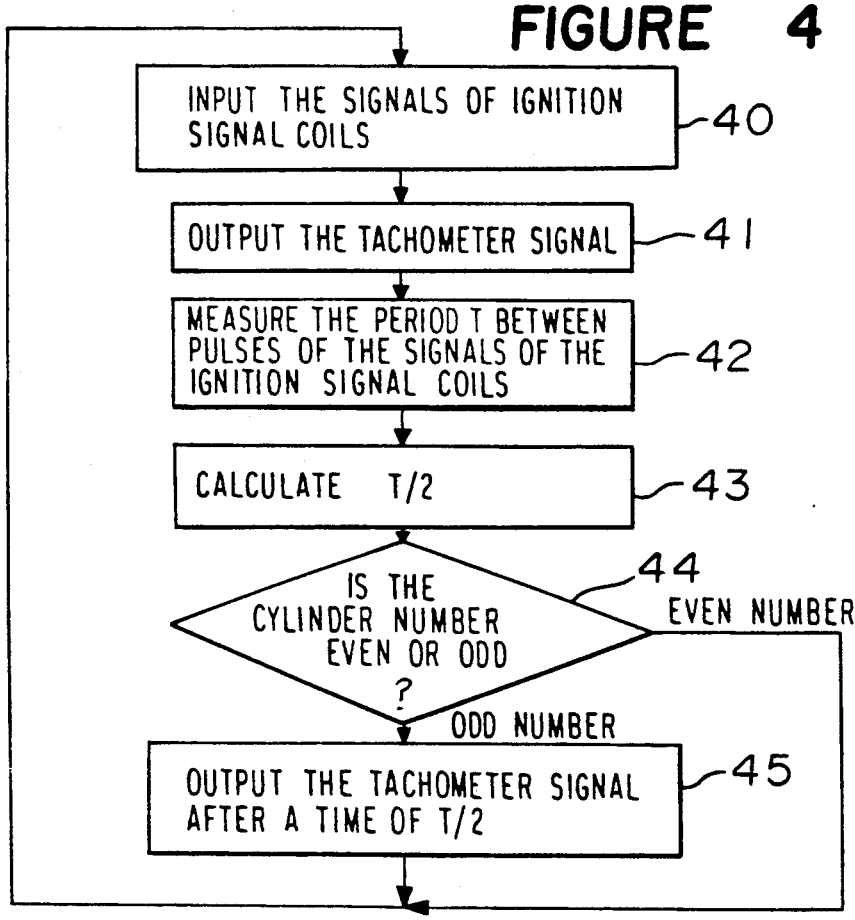
FIG. 4 is a flow chart showing the operation of the second embodiment of the present invention.
Figure 7:
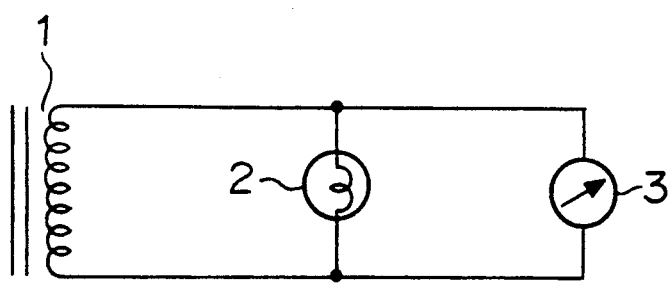
FIG. 7 is a circuit diagram showing a conventional tachometer signal generating device.

In FIG. 4, at Step 40, signals having negative pulses of the ignition signal coils 4-8 are inputted to the microcomputer 7.

At Step 41, the microcomputer generates a tachometer signal in synchronism with the pulse signals, and the tachometer signal is outputted to the tachometer 3.

At Step 42, the period T between a pulse signal at this time and a pulse signal at the last time is measured.

At Step 43, the half of the T, i.e. T/2 is calculated.

At Step 44, discrimination is made as to whether the cylinder number is even or odd. When the cylinder number is even, the sequential step is returned to Step 40.

On the other hand, when the cylinder number is odd, the process of Step 45 is taken.

At Step 45, a tachometer signal is outputted after a time of T/2, and the sequential step is returned to Step 40.

Thus, The microcomputer outputs the tachometer signal of 6 pulses/one revolution as shown in FIG. 6. In FIG. 6, the intervals of pulses in the tachometer signal are not equal. However, this causes no trouble in practical application. The first pulse of the tachometer signal after the first time period of T/2 is not outputted because the period T can not be measured.

In the above-mentioned embodiments, description has been made as to the microcomputer adapted to perform ignition control. However, a control for fuel to be supplied to the engine can also be performed by the microcomputer.

In the above-mentioned embodiments of the present invention since a tachometer signal of 6 pulses/one revolution is generated on the basis of the pulse signals from the ignition signal coils by using the ignition signal coils and the microcomputer, it is possible to use a commercially available tachometer of six pulses/one revolution. It is possible to select a tachometer regardless of the number of poles of a generator. Further, designing of the generator can be easy. Further, a circuit to be added for changing the number of pulses per revolution is unnecessary. Accordingly, the tachometer signal generating device of the present invention is very advantageous from the viewpoint of cost.

In the above-mentioned embodiments, the application of the tachometer signal generating device to a three cylinder engine and the four cylinder engine is exemplified. Even when the present invention is applied to a six cylinder engine, the same effect as described above can be expected by six pulses in synchronism with the pulse signals of the ignition signal coils.

Thus, in accordance with the present invention, any special circuit such as a signal multiplier circuit is unnecessary and a tachometer signal of six pulses/one revolution can be generated in an economical manner regardless of the number of poles of a generator.

Obviously, numerous modifications and variations of the present invention are possible in light of the above teachings. It is therefore to be understood that within the scope of the appended claims, the invention may be practiced otherwise than as specifically described herein.

What is claimed is:

1. A tachometer signal generating device which comprises:

signal coils which generate pulse signals corresponding to predetermined crank angle positions in synchronism with revolution of an engine, and a microcomputer which generates ignition control signals or fuel control signals on the basis of the pulse signals and which generates a tachometer signal of 6 pulses/one revolution.

2. The tachometer signal generating device according to claim 1, wherein the microcomputer receives pulse signals from first and second ignition signal coils in synchronism with the pulse signals, measures the period T between the pulse signals, calculates T/2 and generates the tachometer signal of 6 pulses/one revolution.

* * * * *